Oct. 17, 1933.  J. B. NEIL  1,930,767
COTTON PICKER
Filed Dec. 1, 1930   7 Sheets-Sheet 1
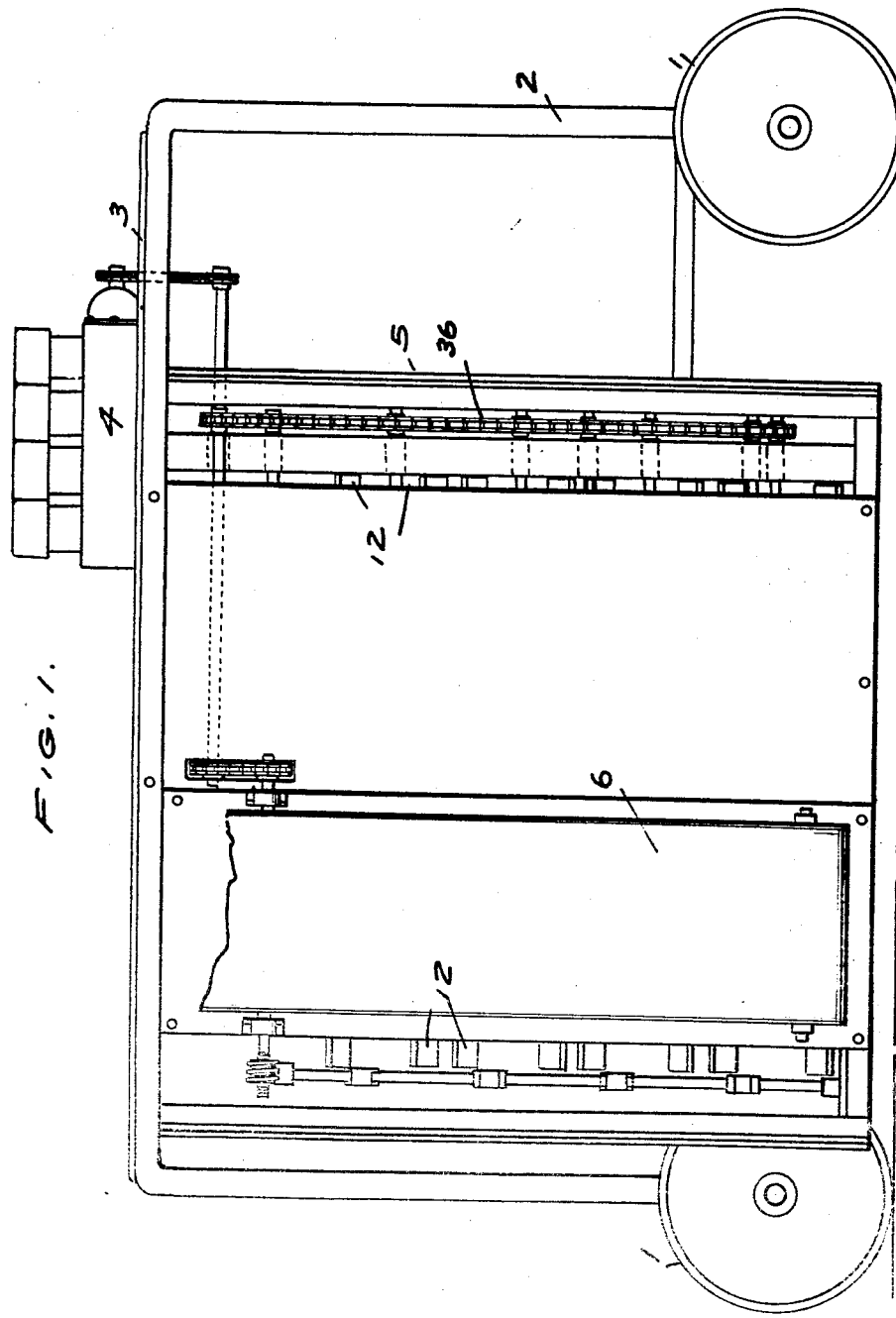
JOSEPH B. NEIL
Inventor
By C.A.Snow&Co.
Attorneys.

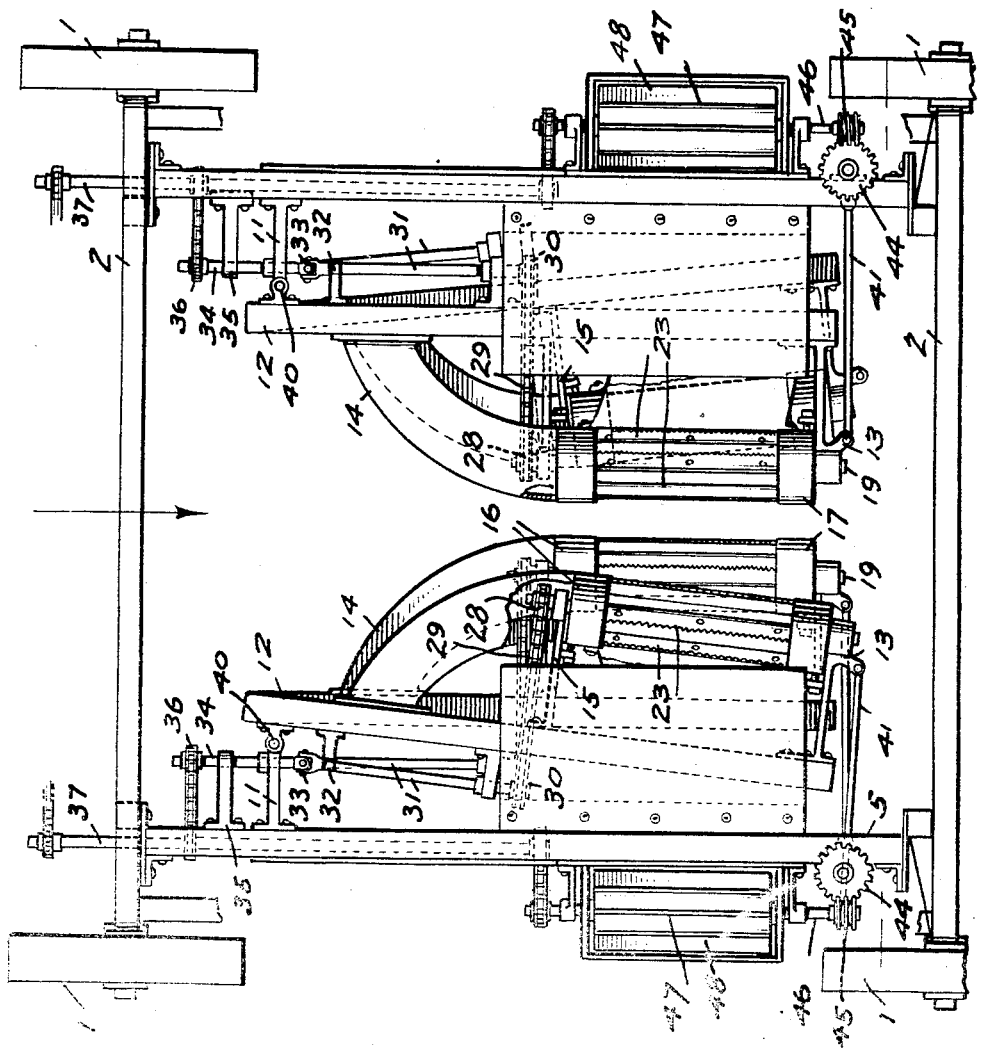

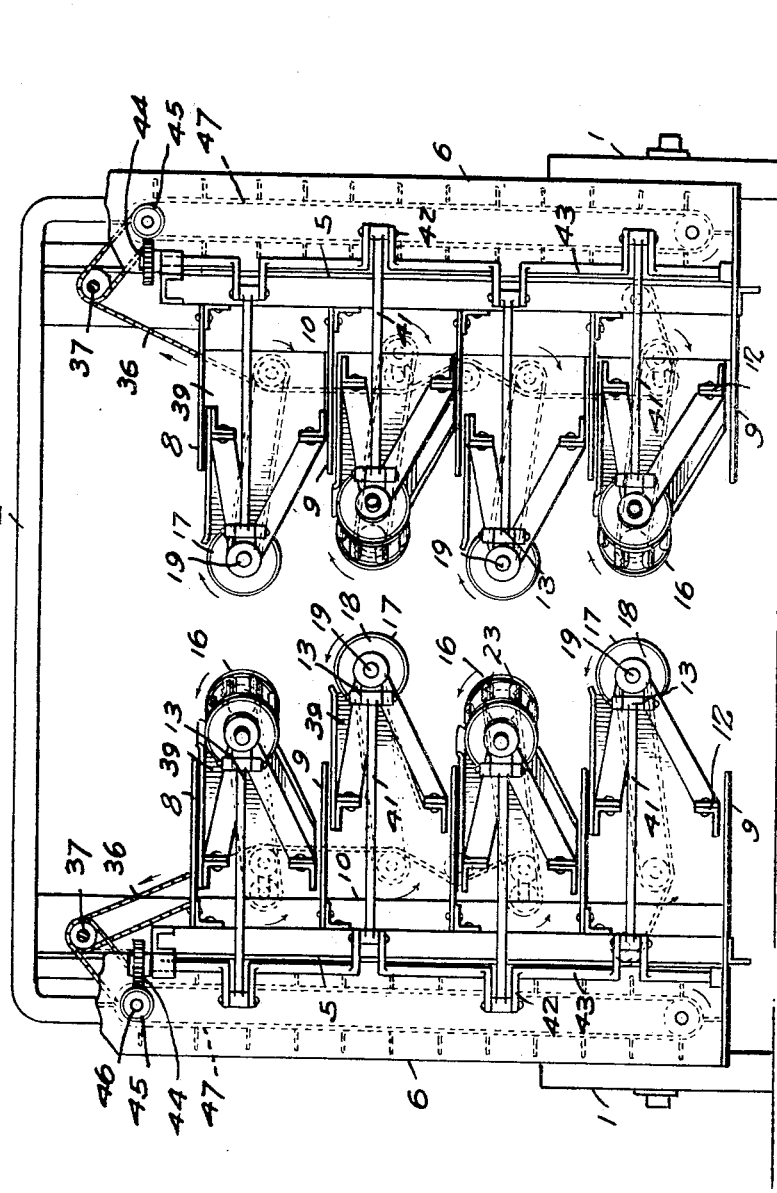

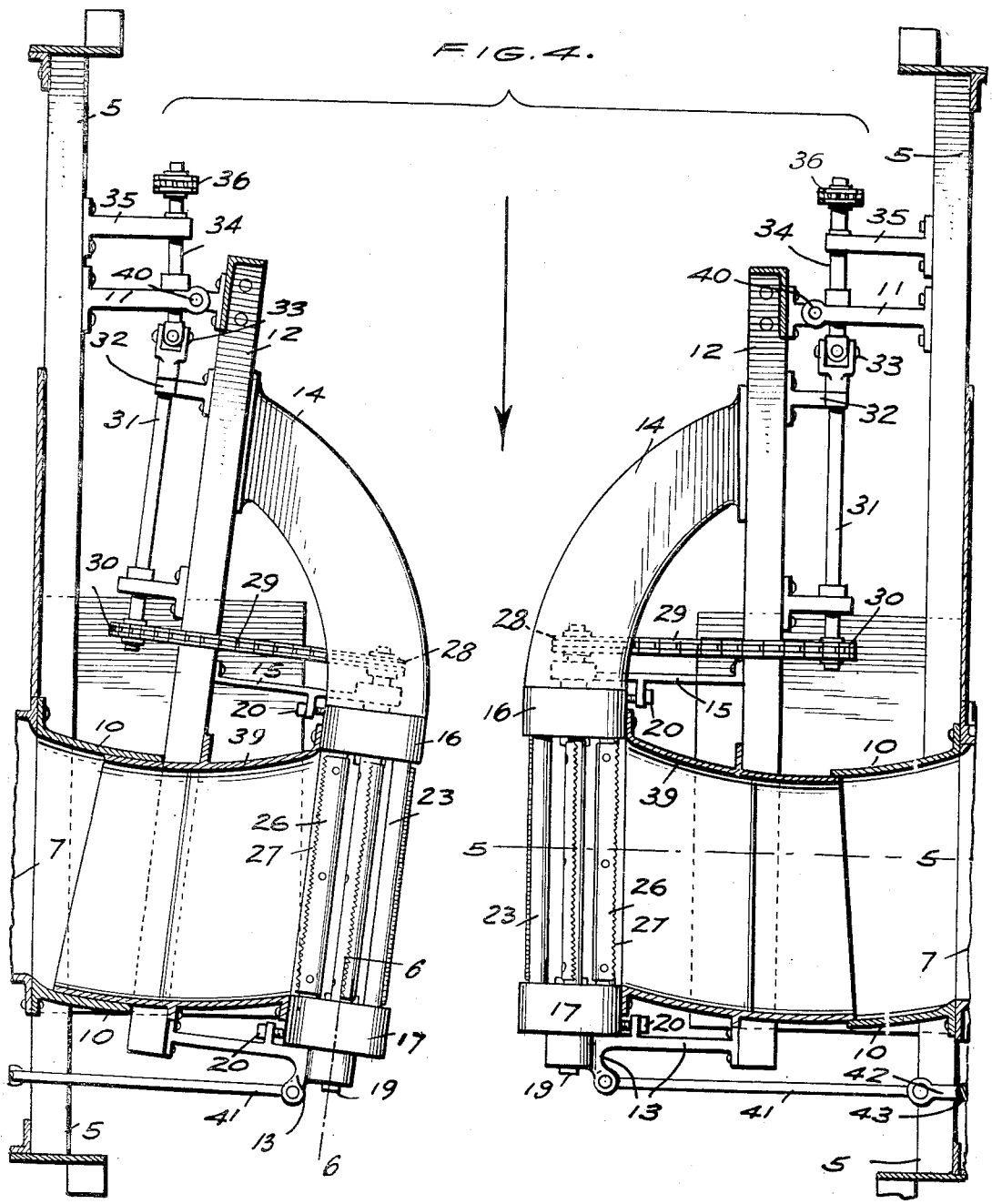

Oct. 17, 1933.    J. B. NEIL    1,930,767
COTTON PICKER
Filed Dec. 1, 1930    7 Sheets-Sheet 5
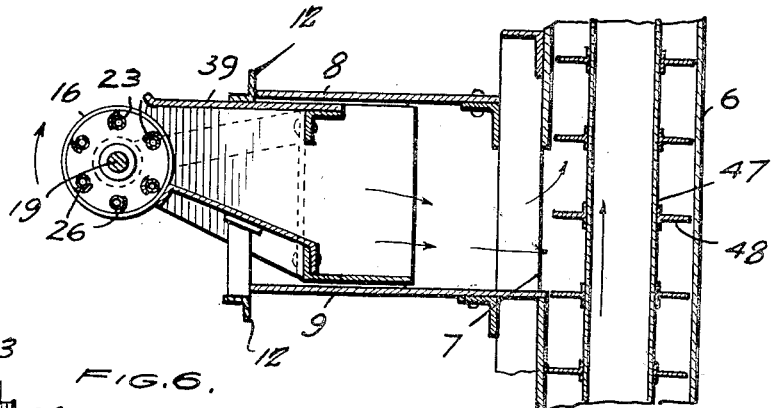
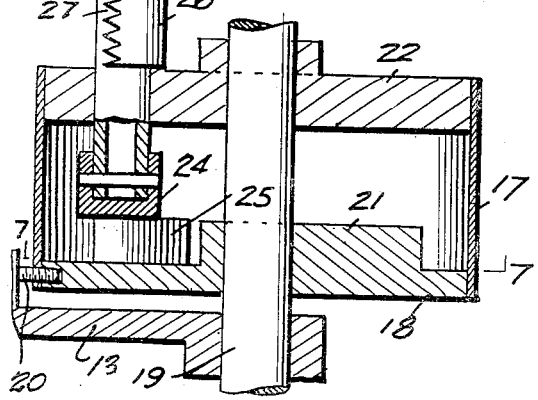
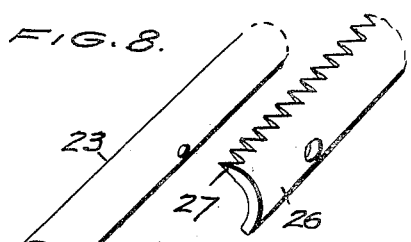
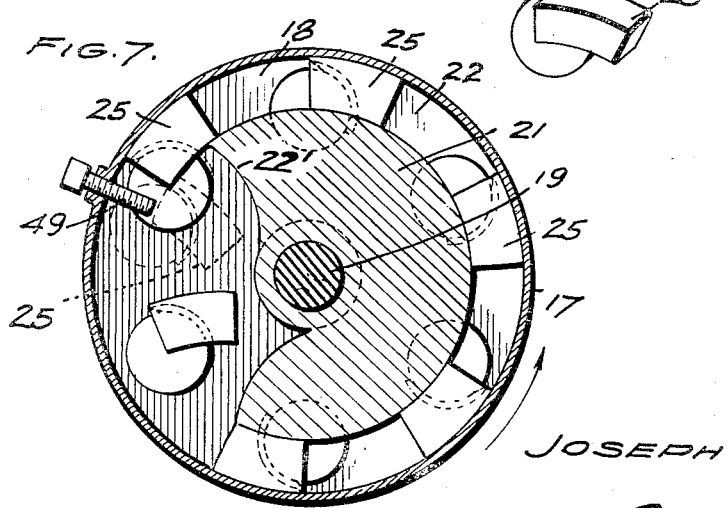
JOSEPH B. NEIL
Inventor

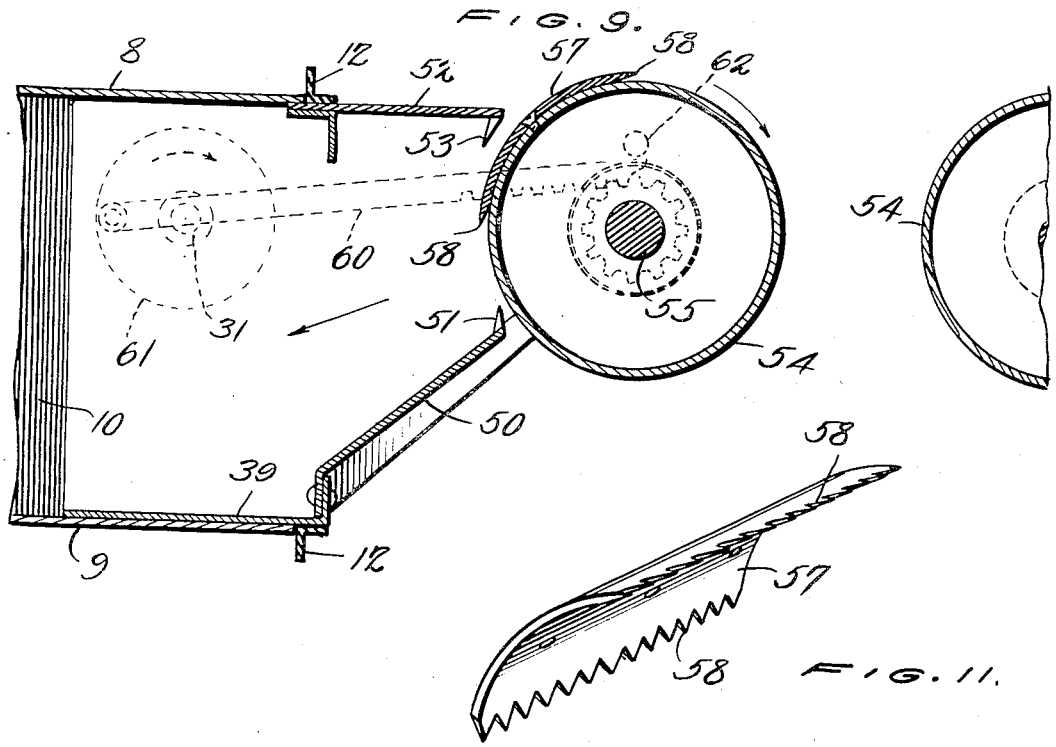
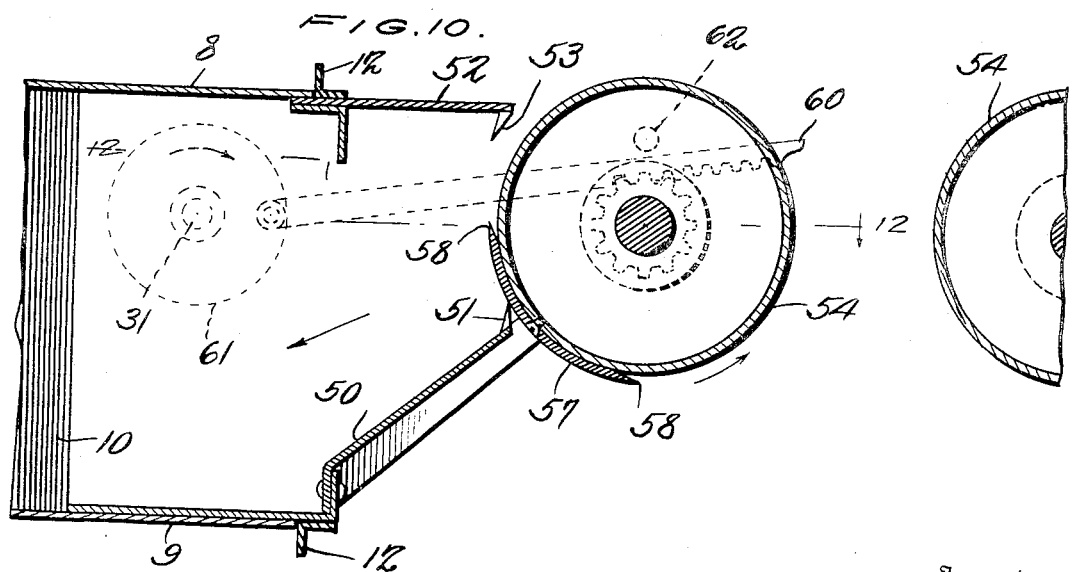

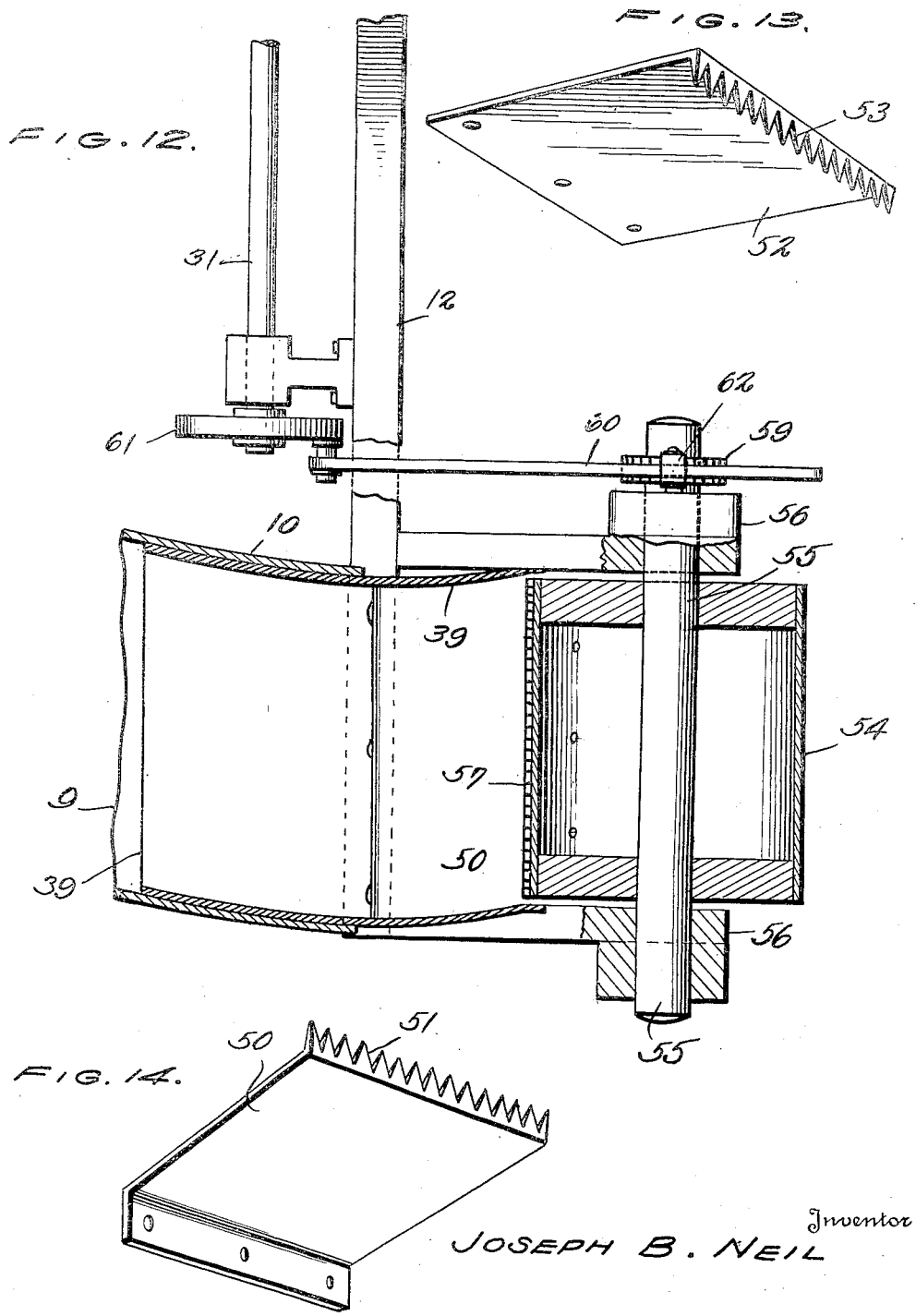

Patented Oct. 17, 1933　　　　　　　　　　　　　　　　1,930,767

UNITED STATES PATENT OFFICE 1,930,767

COTTON PICKER

Joseph Brown Neil, York, S. C.

Application December 1, 1930. Serial No. 499,343

5 Claims. (Cl. 56—14)

This invention relates to a machine for picking cotton.

One of the objects of the invention is to provide a machine having picking rolls arranged in opposed groups, the rolls of these groups being revolvable about a common center during the operation of the machine.

Another object is to provide picking rolls disposed in groups, the rolls being independently revolvable about individual axes so as to be brought successively into positions for engaging the cotton and delivering it.

A still further object is to provide picking rolls which, during their rotation about their individual and common axes will be swung laterally toward and away from the plants being acted on so that bolls located at any points on the plants will be reached ultimately by one of the rolls and removed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings the preferred form of the invention has been shown.

In said drawings:

Figure 1 is a side elevation of the machine, some parts of the structure which are non-essential, being removed.

Figure 2 is a top plan view, the non-essential superstructure being removed.

Figure 3 is a rear elevation of the opposed picker frames and the parts carried thereby.

Figure 4 is an enlarged view partly in plan and partly in section of opposed portions of the picking mechanism.

Figure 5 is a section on line 5—5, Figure 4.

Figure 6 is an enlarged section through one end portion of one of the picking units, taken substantially on line 6—6, Figure 4.

Figure 7 is a section on line 7—7, Figure 6.

Figure 8 is a perspective view of one end portion of a picking roll, the parts being separated.

Figure 9 is a vertical section through a modified form of picking unit.

Figure 10 is a view similar thereto showing the roll in another position.

Figure 11 is a perspective view of the toothed strip used in connection with the modified form of picking unit.

Figure 12 is a view partly in plan and partly in section taken on line 12—12, Figure 10.

Figure 13 is a perspective view of one of the doffing or stripping plates.

Figure 14 is a similar view of another doffing plate.

Referring to the figures by characters of reference, 1 designates supporting wheels carrying yokes 2 on which is arranged any suitable superstructure 3. This super-structure can be used to support a motor 4 designed to drive the mechanism of the picker. The machine can be propelled along long rows of plants under its own power or can be pulled by any suitable means provided for that purpose.

Suitably suspended from the side portions of the super-structure are picker frames 5.

Each of the picker frames is provided adjacent to its rear end with an upwardly extended housing 6 which is provided with superposed inlet openings 7 and extending from each picker frame at each of the openings 7 is a guide housing formed of upper and lower plates 8 and 9 joined by connecting walls 10. The number of these housings is the same as the number of picking units carried by each frame 5. In the present instance four picking units are carried by each frame as will be explained hereinafter, and, consequently, four of the guide housings are extended from each frame. The guide housings on each frame are disposed directly opposite the corresponding housings of the other frames and are extended toward each other.

Mounted on each of the picker frames 5 are superposed brackets 11 located between the housings and the front ends of the frames. To each of these brackets is hingedly connected the front end portion of an oscillating frame 12. This frame extends past the plates 8 and 9 of the housing associated therewith and is provided at its rear end with a bracket 13. A combined bracket and deflecting arm 14 is secured to the forward portion of frame 12 and curves laterally and rearwardly, its back end being supported by a bracket 15 which extends from the frame 12. A casing 16 is secured to the rear end of the arm 14 and another casing 17 is secured to the bracket 13. Each of these casings is provided with a head 18 which is fitted within and secured to the casing.

A shaft 19 is journaled in the brackets 13 and 15 and is concentric with the casings 16 and 17. Each casing can be adjusted annularly on shaft 19 after which it can be held against rotation by any suitable means, such as a set screw 20 carried by the adjacent bracket.

The head 18 of casing 17 has a cam 21 fixed thereto. This cam has a portion of its periphery cut away as shown at 22' and constitutes a track for the purpose hereinafter explained. If the casing 16 is adjustable annularly its head 18 is also provided with a cam 21 such as shown, for example, in Figures 6 and 7.

Secured to the shaft 19 so as to rotate therewith within the respective housings 16 and 17 are disks 22 and in these disks are journaled rock shafts 23 which are regularly spaced annularly. To one end of the shaft is secured a cap 24 having a tangential finger 25 so positioned as to travel along the periphery of the cam 21. Secured to each shaft 23 and extending longitudinally thereof is an arcuate strip 26 which embraces the shaft and extends close to the disks 22. One edge of the strip 26 is formed with teeth 27 the points of which are spaced from the shaft.

Each shaft 19 has a sprocket 28 located back of the arm 14 and adapted to receive motion through a chain 29 from another sprocket 30 secured to a shaft 31. This shaft is journaled in brackets 32 projecting outwardly from the frame 12. The shaft is joined by a universal coupling 33 to a shaft 34 journaled in a suitable bearing 35 provided therefor on the frame 5. All of the shafts 34 carried by the frame 5 are adapted to be driven simultaneously and at the same speed by chain and sprocket mechanism, indicated generally at 36, which, in turn, is driven by a power shaft 37 having a driving connection 38 with the motor 4.

Each picking unit projects into one end of a box 39 which is open. The other end of this box is slidably mounted in the adjacent housing formed by the plates 8 and 9 and the connecting walls 10. The bottom of the box is preferably inclined so that material falling thereon will slide into the housing by gravity. The front and back walls of the box as well as the corresponding walls of the box as well as the corresponding walls of the housing can be curved and concentric with the hinge 40 whereby frame 12 is connected to bracket 11.

A pitman 41 connects bracket 13 to one of a series of cranks 42 carried by shaft 43 which is journaled on the rear portion of the frame 5. This shaft is adapted to receive motion from any suitable mechanism provided for that purpose. For example, the upper end of the shaft can be provided with a worm gear 44 engaged by a worm 45 carried by a shaft 46 which extends transversely through the upper portion of the housing 6. On this shaft has been mounted an endless elevator 47 disposed vertically within the housing 6 and extending back of the openings 7 belonging to all of the picking units. This elevator has outwardly extending blades 48 and that portion of the elevator nearest the opening moves upwardly.

As has already been explained the two picker frames 5 are oppositely disposed and each of these frames carries several picking units. In the present instance each frame has five picking units and each unit is of the same construction and operates in the same manner as the other units. The picking units are supported between the frames 5 and the cranks 42 are so positioned that the corresponding ones on the two shafts 43 operate in unison. In other words when one crank 42 is extended to the right the corresponding crank on the other shaft is also extended to the right. Thus the mechanisms controlled by the two cranks will simultaneously move in the same direction laterally.

When the machine is moved forwardly a row of plants to be acted on will be located between the two opposed picking units. All of the picking units will rotate continuously as indicated by the arrows in Figure 3, motion being transmitted to them from the motor 4 through the power shaft 37 and their connections which have already been described.

As each picking unit rotates with its shaft 19 those rock shafts 23 nearest to the plants will be held against rotation about their individual axes because the fingers 25 connected thereto are riding on the periphery of the cam 21. This will be clearly seen by referring to the right-hand portion of the Figure 7. With the teeth thus held they will bite into cotton bolls and pull the cotton from the plant, carrying it upwardly and back into the box 39. After each rock shaft 23 enters the box 39 the advancing portion of the finger 25 will come against stop pin 49 which is located opposite the peripheral recess 22' in the cam 21. The advancing finger will be swung back into the recess 22' so that it can pass under pin 49, as shown by broken lines in Figure 7. Movement of the finger will cause shaft 23 to rock and withdraw fingers 25 from engagement with the cotton. The cotton will then be deposited on the bottom of the box 39 and travel downwardly into the housing back of the box. After the fingers have passed downwardly below the bottom of the box 39 they will come against the adjacent end of the recess 22' and rock the shaft 23 back to its normal position where the teeth 27 can again engage the cotton.

It will be apparent from the foregoing that during each rotation of the picking unit the several shafts 23 included therein will be brought into active position successively to cause their teeth 27 to strip cotton from the plants and to convey the cotton back to and deliver it into the box 39.

The cotton entering the housing formed by the plates 8 and 9 and the walls 10 will pass through the openings 7 and be picked up by the blades of the conveyor or elevator 47.

While the cotton is picked from the plants by the unit as already explained, said unit can be oscillated transversely by the pitmans 41 so that each of the picking units will thus be forced laterally into the plants and then withdrawn therefrom. This will insure picking of practically all of the cotton on the plants, because the picking units are thus caused to comb through the plants intermittently. The arms 14 guide the plants properly into the space between the picking units while the rear end portions of the picking units are being oscillated.

In Figures 9 to 14 inclusive there has been shown a modified form of picking unit utilizing a greatly simplified structure. Each of these picking units utilizes a curved housing made up of plates 8 and 9 and walls 10 as heretofore explained and slidable in each of these housings is a box 39 such as has been described in the foregoing description.

In the present instance the box 39 is provided with an inclined doffing or stripping plate 50 provided along its free edge with a row of upstanding teeth 51. Another strip plate 52 extends from the top of the box 39 and is provided at its free edge with a row of downwardly extending teeth 53.

The roll 54 used in this modified structure extends across the space between the free edges of plates 50 and 52 and is supported close to the teeth 51 and 53 by a shaft 55 the ends of which are journaled in plates 56 fixedly connected to and extending laterally from frame 12. To the periphery of the roll is fastened a picking strip 57 which extends throughout the length of the roll and a short distance around the roll. Along each longitudinal edge of the strip are provided picking teeth 58 which are spaced from the surface of the roll as shown and are adapted to travel close to but out of contact with the doffing teeth 51 and 53.

Secured to the shaft 55 so as to rotate therewith, is a gear 59 constantly meshing with a rack 60 which bears downwardly on the gear and is pivotally connected at one end to a disc 61 carried by shaft 31.

One unit such as described is adapted to be used in lieu of each of the picking units heretofore described. It will be apparent that when the machine is moved along a row of cotton plants the rotating shaft 31 will cause the rack 60 to reciprocate under a guide pin 62 and rotate gear 59 back and forth. This will produce a corresponding back and forth rotation of roll 54. Consequently as disc 61 travels from the position shown in Figure 9 and in the direction of the arrow to the position shown in Figure 10, the upper series of teeth 58 will travel toward and downwardly through the plants adjacent thereto stripping from them the cotton fibers and carrying the cotton laterally and then upwardly past the teeth 51 until the roll reaches the position shown in Figure 10. Continued rotation of disc 61 in the direction of the arrow in Figure 10 will result in reversal of the rotation of roll 54 with the result that the cotton which had been brought to the space between the plates 50 and 52 will be carried downwardly to the teeth 51 and stripped thereby from the teeth 58. As this operation is taking place the roll teeth 58 in Figure 10 will comb upwardly through the adjacent plants and remove cotton therefrom carry it upwardly and laterally and thence downwardly past the teeth 53 until brought to the position of the lower teeth 58 in Figure 9.

Further rotation of disc 61 will again reverse the movement of the roll 54 with the result that the cotton which has been brought to position under plate 52 will be stripped off of teeth 58 by the teeth 53 as the roll 54 proceeds in the direction indicated by the arrow in Figure 9.

In practice it has been found desirable to extend the toothed strip 57 over approximately one-fourth of the circumference of the roll 54 so that should any cotton pods or other long growths become caught by one set of teeth 58 it would not be possible for it to become caught in the other set of teeth and thus choke the mechanism.

The cooperation of teeth 58 with the teeth 51 and 53 is such as to not only assure positive stripping of the cotton from the roll 54 even though it should be mixed with long grass or vegetation, but it also insures proper feeding of the harvested cotton back into the box 39 and housing 9 so that it can be carried off by the means provided therefor.

By utilizing a picking roll for a back and forth rotation it will pick cotton on both the up and down movements, thereby insuring a larger percentage of picked cotton during one harvesting operation than it would be possible to obtain by other mechanisms.

The teeth 58 can be sharpened readily by detaching plate 57 from the roll 54. It is also possible to detach the plates 50 and 51 should it be found desirable to sharpen the teeth thereon.

What is claimed is:

1. A cotton picking machine including a portable structure, frames supported thereby for receiving standing plants therebetween, deflecting means carried by the frames for engaging the plants, rotatable picking units movable with the frames and extending longitudinally thereof, said units being disposed back of the deflecting means, and means for oscillating the frames transversely of the machine during the operation of the picking units, an elevator supported adjacent each frame, and telescopic means for directing picked cotton from the picking units to the elevators.

2. A cotton picking machine including a picking roll mounted for rotation, opposed doffing teeth adjacent to the periphery of the roll, oppositely extending series of picking teeth carried by the roll, and means for rotating the roll back and forth to alternately advance each series of picking teeth through the adjacent plants and past one set of doffing teeth.

3. In a cotton picking machine a picking roll, oppositely extending sets of picking teeth on the periphery of the roll, oppositely extending series of doffing teeth adjacent to the roll, and means for rotating the roll back and forth, each movement of the roll operating to advance one set of picking teeth through adjacent plants to strip cotton therefrom and convey it past one set of doffing teeth to position between both sets of doffing teeth, and withdrawing the other set of picking teeth from between the sets of doffing teeth to strip cotton from the withdrawing teeth.

4. In a cotton picking machine a portable structure, a frame hingedly connected thereto, a picking roll supported by the frame, oppositely extending series of picking teeth carried by the roll, superposed spaced series of doffing teeth adjacent to the roll, and means for rotating the roll in opposite directions successively to successively advance each series of picking teeth through adjacent plants and convey picked cotton past one set of doffing teeth into position to be stripped by said doffing teeth during the rotation of the roll in the opposite direction.

5. In a cotton picking machine, a picking element including a rotatable cylindrical member, an arcuate picking strip secured upon and seated snugly on said member, each of the opposed longitudinal edges of the strip having a series of teeth extended substantially circumferentially of the cylinder, and means for imparting a back and forth rotation to said member to bring the respective series of teeth successively into engagement with material to be picked.

JOSEPH BROWN NEIL.